United States Patent [19]

Tatematsu et al.

[11] Patent Number: 5,579,443
[45] Date of Patent: Nov. 26, 1996

[54] EMERGENCY VEHICULAR COMMUNICATION DEVICE CAPABLE OF CONTACTING A PLURALITY OF SERVICES

[75] Inventors: Junji Tatematsu, West Bloomfield; Yasuhisa Yoshino, Troy, both of Mich.; Toshiyuki Kaneiwa, Konan, Japan

[73] Assignee: Nippondenso Co., Ltd., Kariya, Japan

[21] Appl. No.: 400,396

[22] Filed: Mar. 3, 1995

Related U.S. Application Data

[63] Continuation of Ser. No. 53,134, Apr. 29, 1993, abandoned.

[51] Int. Cl.$^6$ ........................................ H04B 1/38
[52] U.S. Cl. ........................ 455/89; 455/54.2; 455/90; 455/128
[58] Field of Search ..................... 455/54.1, 54.2, 455/68–70, 88–90, 91, 95, 128; 379/38, 40, 42–45, 47, 49, 51, 39; 340/825.44, 825.49, 988, 539, 573, 825.56, 905; 341/24–26, 176, 178; 364/709.06, 709.12, 709.01, 436; 400/480; 116/316, 317; 345/7, 8, 172, 168

[56] References Cited

U.S. PATENT DOCUMENTS

| | | | |
|---|---|---|---|
| 3,986,119 | 10/1976 | Hemmer, Jr. et al. | 455/54.1 |
| 4,176,254 | 11/1979 | Tuttle et al. | 379/45 |
| 4,360,875 | 11/1982 | Behnke | 364/436 |
| 4,524,243 | 6/1985 | Shapiro | 379/38 |
| 4,942,841 | 7/1990 | Drucker, Jr. | 116/317 |
| 5,159,317 | 10/1992 | Brav | 340/825.45 |
| 5,175,759 | 12/1992 | Metroka et al. | 455/89 |
| 5,225,826 | 7/1993 | DeLuca et al. | 340/825.44 |
| 5,343,493 | 8/1994 | Karimullah | 379/37 |
| 5,363,436 | 11/1994 | McMonagle, Jr. et al. | 379/355 |

FOREIGN PATENT DOCUMENTS 64-57599   4/1989   Japan.

OTHER PUBLICATIONS

Journal of Nippodenso Technical Disclosure, p. 139 disclosure #56–139, dated Nov. 15, 1987.

*Primary Examiner*—Reinhard J. Eisenzopf
*Assistant Examiner*—Gertrude Arthur
*Attorney, Agent, or Firm*—Cushman, Darby & Cushman

[57] ABSTRACT

A vehicular communication device includes a plurality of request switches, a request signal generator means, a transmitter, a receiver and a display. The request switches respectively designate a plurality of services which a user may request. The request signal generating means checks the operational conditions of all request switches in order to enable the user to operate at least two of the request switches substantially simultaneously. The request signal generator then generates a request signal on the basis of the checking. The transmitter transmits the request signal to a remote service facility. The receiver receives an acknowledgment signal received signal transmitted from the service facility. The display displays a message in accordance with the acknowledgment signal for assuring the user that the request signal has been received by the service facility.

37 Claims, 10 Drawing Sheets

AMBULANCE SIGNAL RECEIVED
POLICE SIGNAL RECEIVED

AMBULANCE
ETA 10 MIN

POLICE
ETA 10 MIN

5,579,443

EMERGENCY VEHICULAR COMMUNICATION DEVICE CAPABLE OF CONTACTING A PLURALITY OF SERVICES

This is a continuation of application Ser. No. 08/053,134, filed on Apr. 29, 1993, which was abandoned upon the filing hereof.

BACKGROUND OF THE INVENTION

1. Field of the Invention

The present invention relates to a vehicular communication device, especially suitable for urgently reporting road emergencies.

2. Description of Related Art

A conventional vehicular communication device is disclosed in U.S. Pat. No. 3,986,119. The device has a distress select switch having four positions. Each position of the switch is used for inputting a distress signal (police, accident, towing, service, etc.) corresponding to a rescue item which a user needs. When the user selects one of the positions in an emergency, the selected distress signal is transferred to a control center through roadside relay stations. After receiving this signal, the control center determines the position of the user. The control center then dispatches help to the user, and simultaneously transmits an acknowledgement signal to inform the user that the message has been received. After the communication device receives the acknowledgement signal, an acknowledge indicator of the device is activated. Thus, the user can make sure that the user's message has been surely received.

However, according to the above-mentioned communication device, the user can select only one of the four distress signals with the distress select switch. In other words, the user can not select plural signals at a time. For example, in case that the user was in a car accident, the user generally needs an ambulance, the police and road service. The user has to request these three services one by one even in such an emergency, going through the whole process each time. This requires a lot of time to request help.

In considering the above problems, the inventors have thought that a vehicular communication device may include an exclusive switch besides the above-mentioned distress select switch to enable a user to report plural requests at a time. According to this feature, when the device is used for reporting an emergency which happened, for example, while driving a vehicle, an exclusive switch for requesting an ambulance and the police, an exclusive switch for requesting the ambulance, the police and a road service, and so on, are provided. However, in this case, it is hard to distinguish one switch from the others because the number of the switches is large. Moreover, these switches must be miniaturized due to space limitations. This reduces the chances of proper operation by an operator in an emergency.

Since the user is generally frightened in an emergency, a large number of switches easily causes incorrect operation in that the user operates an incorrect switch. Therefore, such incorrect operation needs to be canceled somehow.

Moreover, when the number of the distress signals is plural, it is desirable that the device enables the user to make sure that each signal has been received by the control center.

SUMMARY OF THE INVENTION

Accordingly, it is an object of the present invention to provide a vehicular communication device which enables the user to report plural requests at a time.

To accomplish the foregoing and other objects, the vehicular communication device includes a plurality of request switches, request signal generating means, transmitting means, receiving means and a display. The request switches respectively designate a plurality of services or items which a user may request. The request signal generating means checks operational conditions of all request switches in order to enable the user to operate at least two of the request switches substantially simultaneously. The request signal generating means then generates a request signal on the basis of the checking. The transmitting means transmits the request signal to a remote service facility. The receiving means receives an acknowledgment signal transmitted from the service facility. The display shows a message in accordance with the received acknowledgment signal to assure the user that the request signal has been received by the service facility.

BRIEF DESCRIPTION OF THE DRAWINGS

The novel features of the present invention are set forth with particularity in the appended claims. The invention, together with the objects and advantages thereof, may best be understood by reference to the following description of the presently preferred embodiments together with the accompanying drawings in which:

DESCRIPTION OF THE PREFERRED EMBODIMENTS

The following preferred embodiments of the present invention resolves all of the above-mentioned problems.

Figure 1:
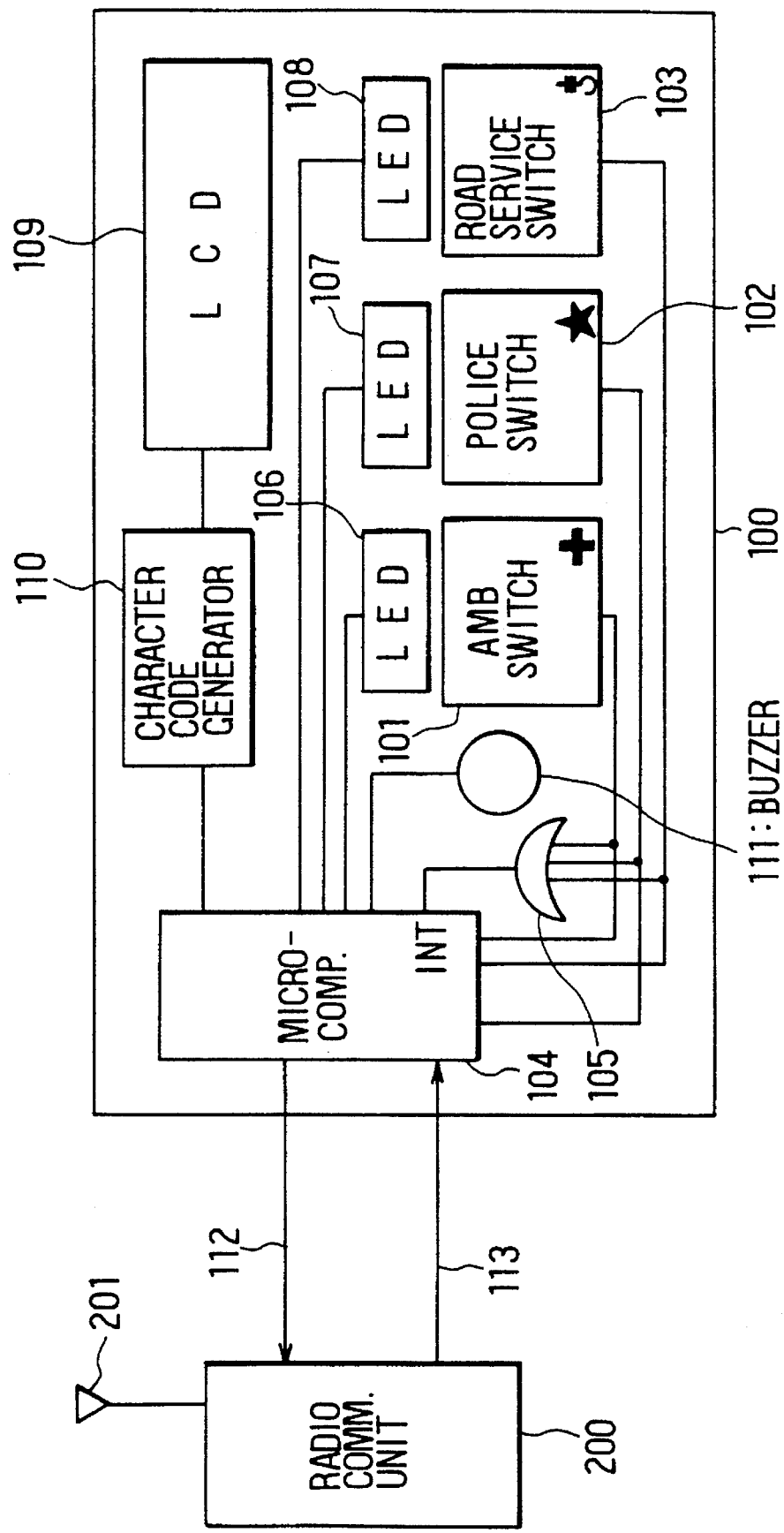
FIG. 1 is a block diagram of a communication device according to an embodiment of the present invention.

FIG. 1 shows a vehicular communication device including a call unit 100 and a radio communication unit 200 which can be installed in an automobile. The call unit 100 has an ambulance switch 101, a police switch 102 and a road service switch 103, used for requesting an ambulance, the police and road service, respectively. It should be noted that the number (3) of these switches 101–103 coincides with the number of kinds of emergency services or items. These switches 101–103 are directly connected with a microcomputer 104 and are also connected with an interrupt terminal INT of the microcomputer 104 through an OR circuit 105. The microcomputer 104 controls the whole workings of the call unit 100. LEDs 106–108 are installed near each switch. When each switch is activated, the LED corresponding to the switch is turned on and off (flashes) or is left on. The call unit 100 also has an LCD (Liquid Crystal Display) 109, a character code generator 110 and a buzzer 111. The LCD 109 displays a message, such as the emergency item, estimated arrival time. The character code generator drives the LCD 109 in accordance with a display order output from the microcomputer 104. The buzzer 111 is used for informing the user that the message is displayed on the LCD 109.

Although FIG. 1 does not show a power supply switch, the switch may be installed in the call unit 100 or at some other place. A power supply may be automatically supplied to the call unit 100 when an ignition switch of the automobile is turned on.

An emergency signal—also referred to herein as a request signal—that the user requested is transmitted to the radio communication unit 200 through line 112 from the microcomputer 104. After receiving the emergency signal, the radio communication unit 200 radios the signal as well as an ID (Identification) code of the unit 200 outward through an automobile antenna 201.

Figure 2:
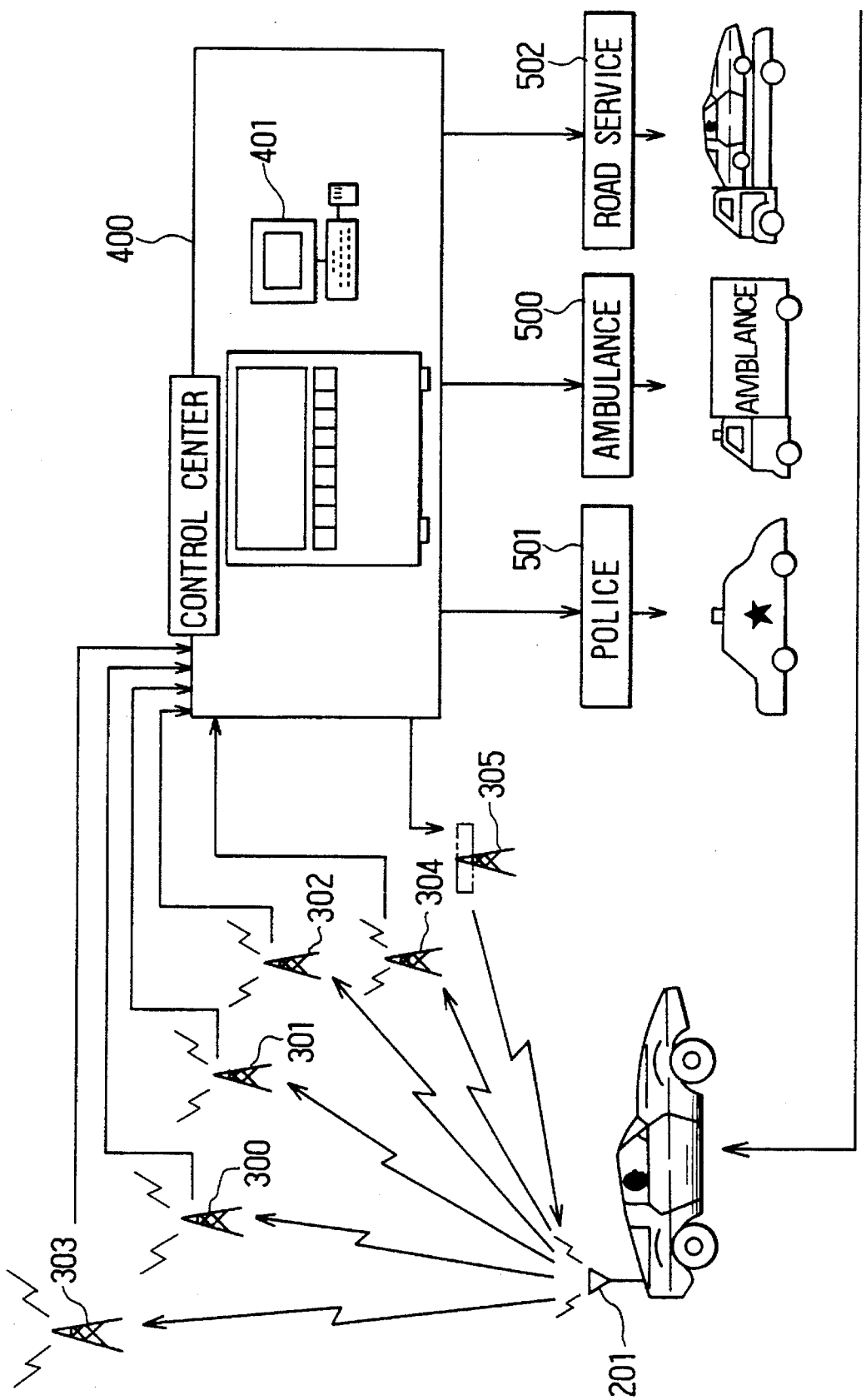
FIG. 2 is a schematic view of an emergency communication system in which the communication device shown in FIG. 1 may be employed.

As shown in FIG. 2, the radioed ID code and emergency signal are received by a control center 400 through relay antennas 300–303, 304 . . . As soon as the control center 400 receives these signals, the center 400 transmits an emergency-signal received signal, i.e., an acknowledgment signal, to the radio communication unit 200 through an exclusive antenna 305. The acknowledgment signal is then transmitted from the radio communication unit 200 to the microcomputer 104 through line 113. The microcomputer 104 orders the character code generator 110 to display the message on LCD 109 in accordance with the acknowledgement signal and buzzer 111 to sound so that the user is assured that the emergency signal has been surely received by the control center 400.

The control center 400 determines the position of the automobile on the basis of receiving signals transmitted from the relay antennas 300–303, 304 . . . and displays the position on a map of a computer. The control center 400 then reports the position and a user's ID (for example, a license plate, a car model, a color of the automobile, user's name, etc.) to service facilities, such as an emergency center 500, the police 501, or a road service center 502 in accordance with the emergency signal. The control center 400 then confirms the estimated rescue arrival time when the requested service(s) will arrive at the position, and transmits a estimated rescue arrival time signal to the radio communication unit 200 through the antenna 305. The estimated rescue arrival time signal is then transmitted from the unit 200 to the microcomputer 104 through line 113. The microcomputer 104 then orders the character code generator 110 to display the message on LCD 109 in accordance with the signal and buzzer 111 to sound so that the user can be relieved.

It is also possible to make use of the communication system of a stolen vehicle locator service as a communication system in FIG. 2. The stolen vehicle locator service utilizes a tracking technology and has already been brought into action in the United States.

Next, the control operation of microcomputer 104 is described with reference to flow charts shown in FIGS. 3–7.

When an automobile user needs rescue or some other service, the user first turns on the power supply switch of the call unit 100 so that the call unit 100 is initialized and stands by for operation.

Figure 3:
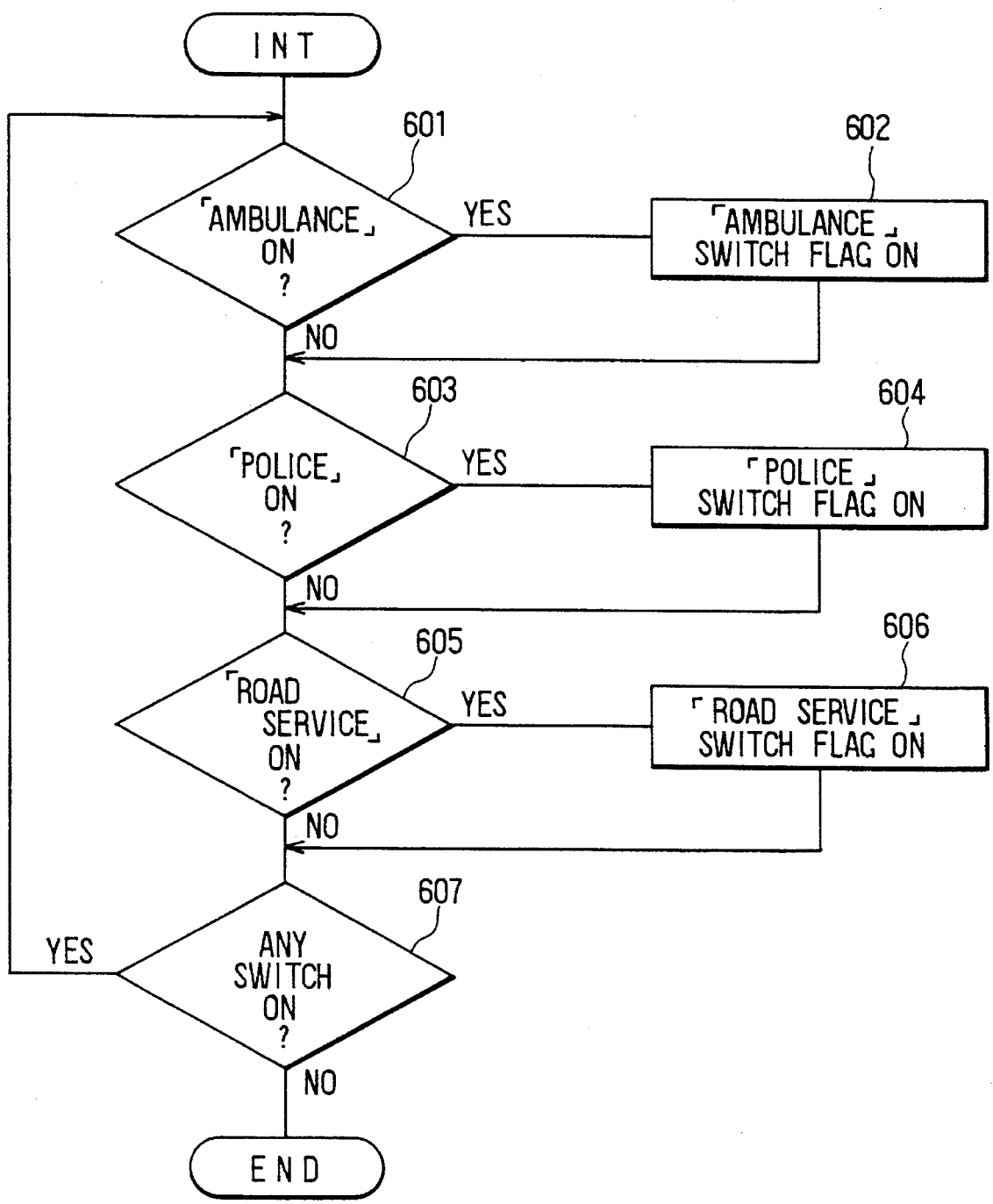
FIG. 3 is a flow chart of an interrupt routine of a microcomputer.

Then, when the user pushes one or more of the ambulance switch 101, police switch 102 and road service switch 103 simultaneously or sequentially, the operation of the microcomputer 104 goes into an interrupt routine as shown in FIG. 3 to turn on a switch flag corresponding to a pushed switch.

It is first judged in step 601 whether the ambulance switch 101 has been pushed. When the ambulance switch 101 has been pushed, step 602 is executed to turn on a switch flag corresponding to the ambulance switch 101. The switch flag is in a memory of the microcomputer 104. When the ambulance switch 101 has not been pushed, or after the switch flag was turned on in step 602, step 603 is executed to judge whether the police switch 102 has been pushed. When the police switch 102 has been pushed, step 604 is executed to turn on a switch flag corresponding to the police switch 102.

When the police switch 102 has not been pushed, or after the switch flag was turned on in step 604, step 605 is executed to judge whether the road service switch 103 has been pushed. When the road service switch 103 has been pushed, step 606 is executed to turn on a switch flag corresponding to the road service switch 103.

When the road service switch 103 has not been pushed, or after the switch flag was turned on in the step 606, the operational flow proceeds to step 607.

In step 607, it is judged whether any one of the switches 101–103 has been pushed. If so, the operational flow returns to step 601 for repeatedly executing the steps 601–606. Otherwise, this interrupt routine finishes.

When the user pushes plural switches at the same time to request plural services, although the user thinks he pushed the plural switches at exactly the same time, the fact is that there is a time difference between pushing the plural switches from the viewpoint of microseconds. The time difference is longer than the process time of steps 601–606 by microcomputer 104. Therefore, without step 607, only one switch flag would be turned on even if the user pushed plural switches at approximately the same time. As a result, the communication device might radio only one emergency signal. According to the present embodiment shown in FIG. 3, the plural switch flags are surely turned on because the period while the user pushes one switch is generally much longer than the process time of steps 601–606 and steps 601–606 are repeatedly executed during the period. Therefore, the communication device enables the user to make plural requests at a time without waiting for each request to be processed before making another request as in the prior art.

FIGS. 4–7 show a main routine of the microcomputer 104. When the power supply switch of the call unit 100 is turned on, the process shown in FIGS. 4–7 is executed. It is first judged in step 701 of FIG. 4 whether a timer has already counted ten seconds (10 S). Since the timer is not started immediately after the power supply switch is turned on, the operational flow proceeds to step 702. In step 702 it is judged whether the switch flag of step 602, corresponding to the ambulance switch 101, has been turned on. When the switch flag has been turned on, step 703 is executed to turn off the switch flag. The following step 704 is executed to judge whether LED 106 corresponding to the ambulance switch 101 has been flashed on and off. When the ambulance switch 101 has been pushed only once after the power supply switch was turned on, LED 106 has not been flashed on and off. Therefore, the operational flow proceeds to step 705 to flash LED 106 on and off and to turn on a transmission flag corresponding to the ambulance switch 101. the transmission flag is in the memory of the microcomputer 104. After the execution of step 705, step 706 is executed to start the timer in order for a predetermined time period (ten seconds in this embodiment) to lapse, for example, by counting through the period.

If during the next cycle, step 704 judges that LED 106 has been flashed on and off, step 707 is executed to stop the LED 106 from being flashed on and off, and to turn off the transmission flag in order to stop the emergency signal for requesting the ambulance from being radioed. The fact that the determination of step 704 results in YES means that the ambulance switch 101 has been pushed twice since the power supply switch was turned on because the determination never results in YES unless the steps 702–705 were executed before. In other words, the user can cancel the above-mentioned incorrect operation by pushing again the same switch that the user pushed before. It should be noted that the cancellation must be carried out within the above-mentioned predetermined period (10 S).

After the execution of step 707, step 708 is executed to judge whether another transmission flag corresponding to another switch, that is the police switch 102 or the road service switch 103, has been turned on. When at least one transmission flag corresponding to another switch has been turned on, the operational flow returns to step 701. On the contrary, when no other transmission flag has been turned on, step 709 is executed to stop the timer, then the operational flow returns to the step 701 to repeat the cycle.

Figure 5:
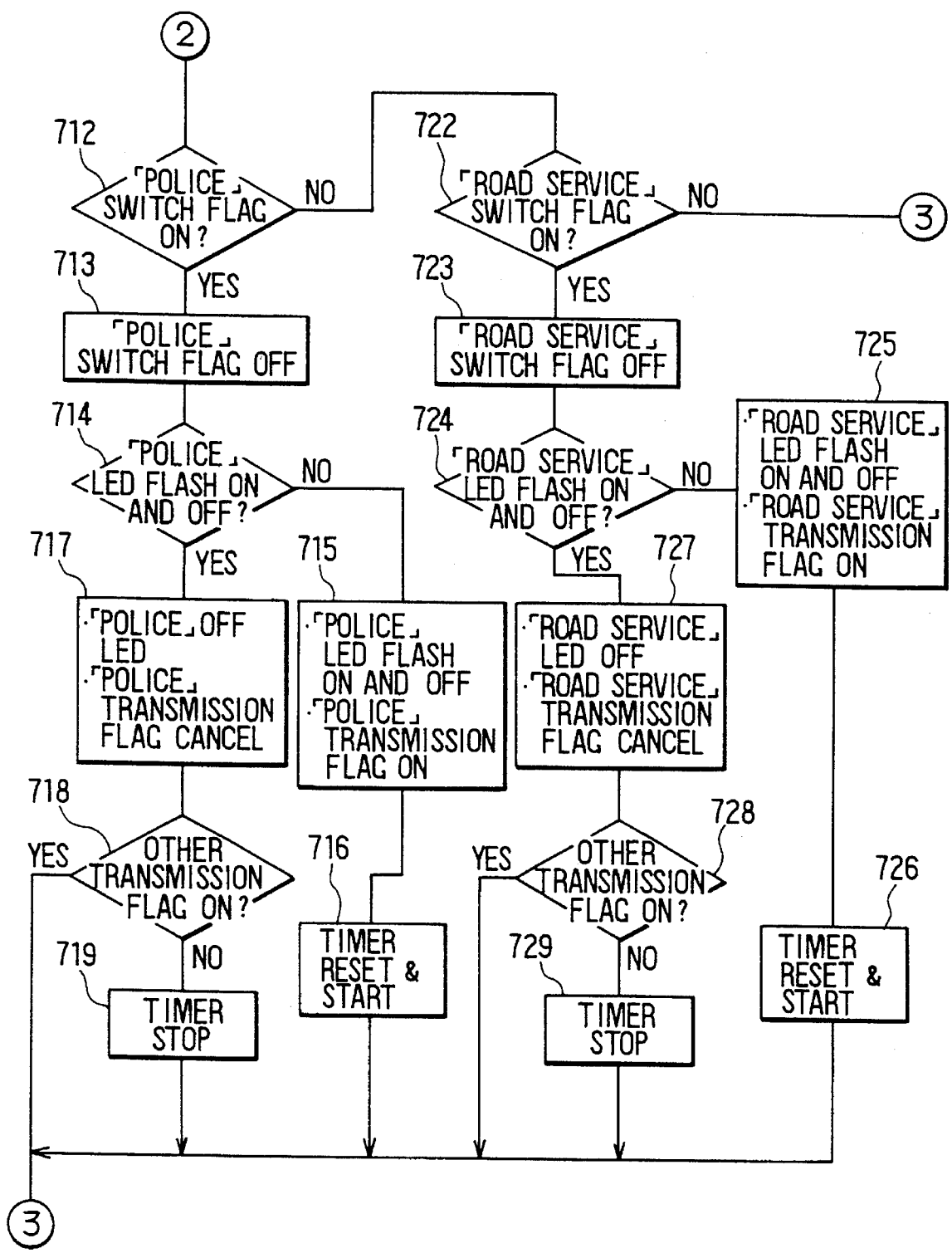

When step 702 determines that the switch flag has not been turned on, the operational flow proceeds to step 712 in FIG. 5. Steps 712–719 are executed for the police switch 102 in the same way as the above-mentioned steps 702–709.

When a switch flag corresponding to the police switch 102 has not been turned, step 712 sends the operational flow to step 722. Steps 722–729 are executed for the road service switch 103 in the same way as steps 702–709.

The control operation of the microcomputer 104 in steps 701–729 is now summarized. The microcomputer 104 checks all switches 101–103 as to whether each switch flag has been turned on. The checking is carried out one after another in accordance with the order of priority (ambulance>police>road service). When a switch flag has been turned on, the microcomputer 104 turns off that switch flag, flashes on and off the LED, turns on the transmission flag and starts the timer. Even if the user pushed a switch by mistake, the user can correct or cancel the incorrect operation by pushing the incorrect switch again within the predetermined period counted by the timer. After the cancellation, by pushing the correct switch the user enables the desired emergency signal to be radioed.

Figure 4:
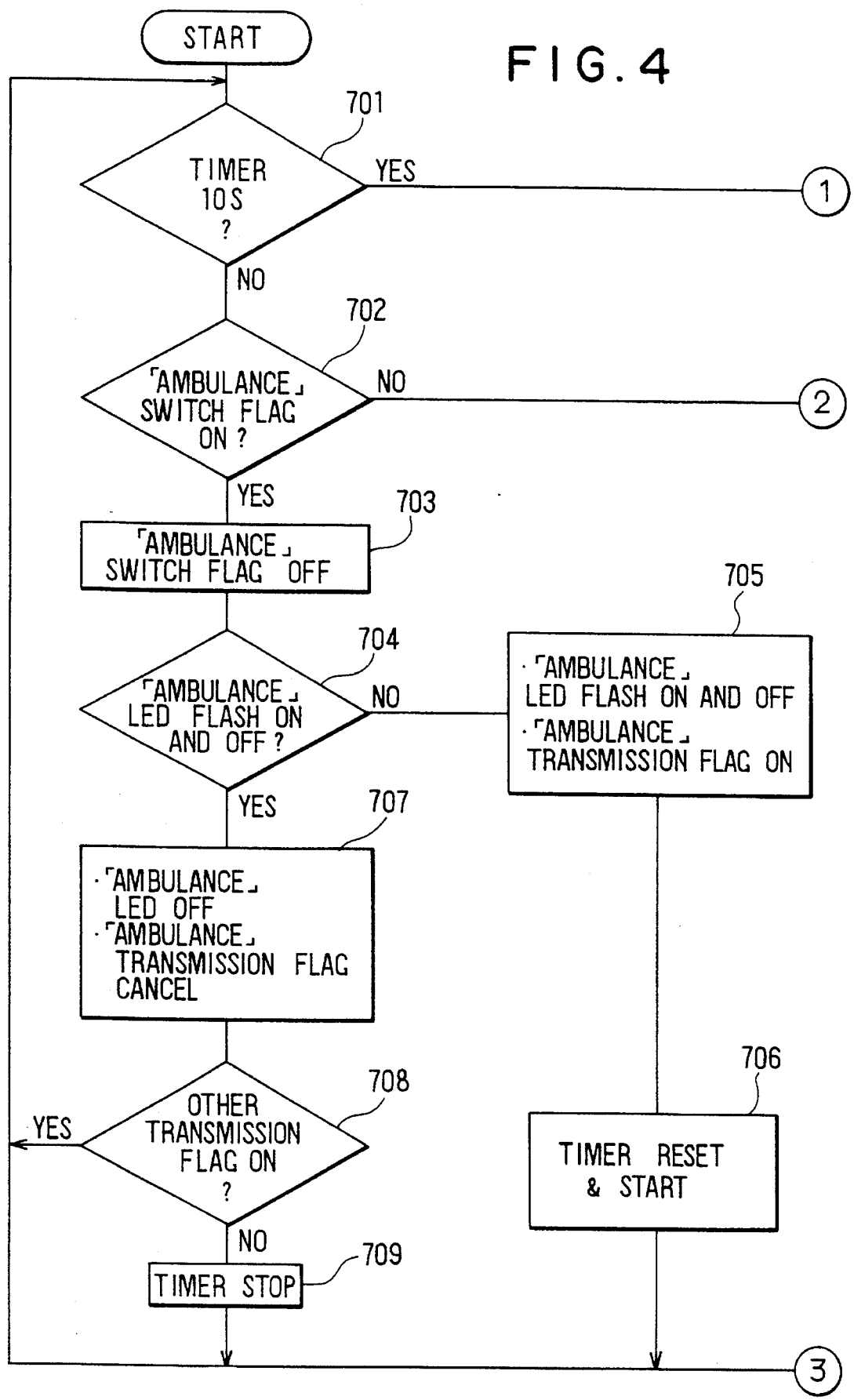
FIGS. 4–7 are flow charts of a main routine of the microcomputer.
Figure 6:
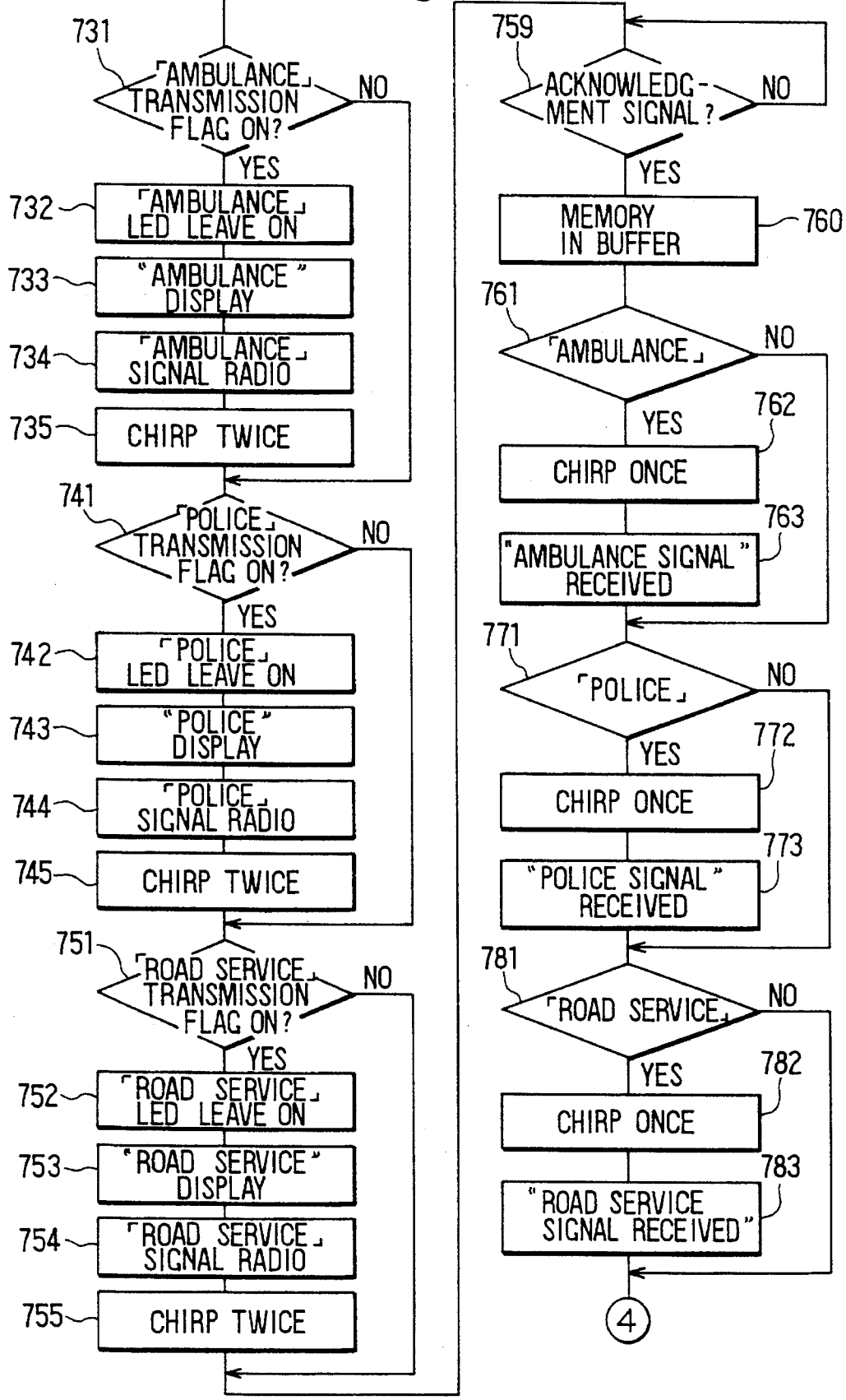
Figure 7:
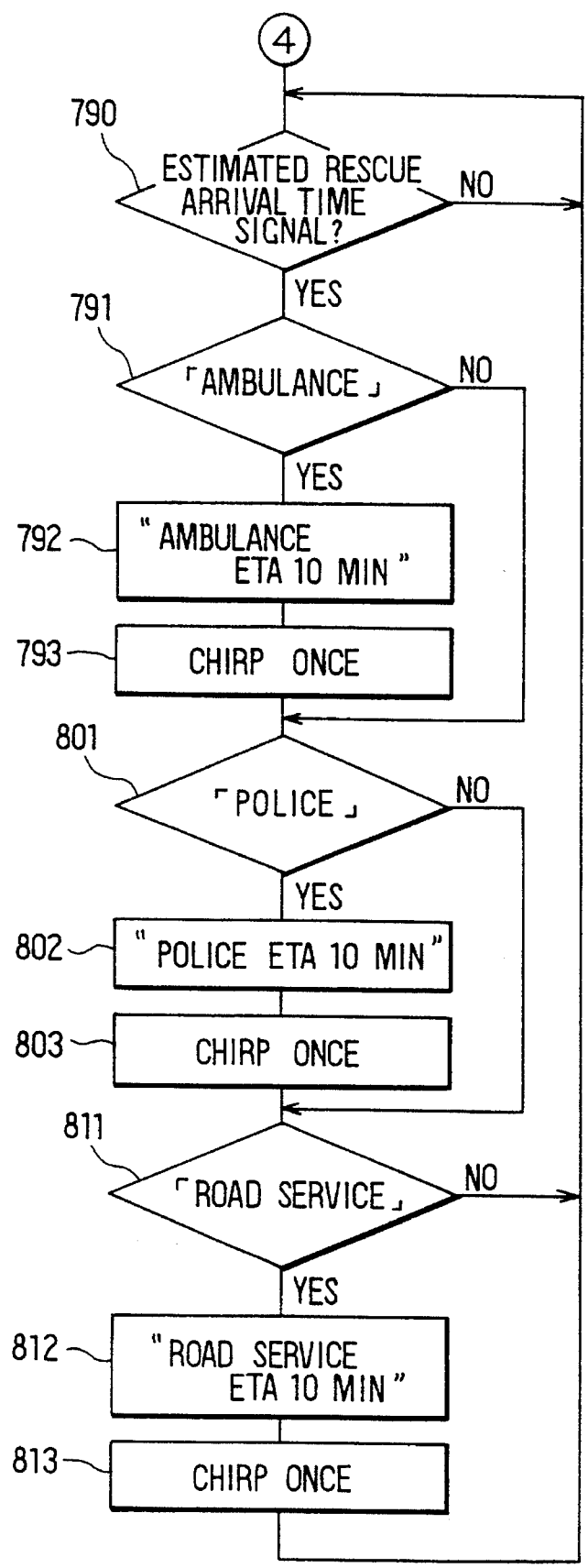

When the timer has counted ten seconds, the microcomputer 104 judges that the emergency item has been settled, and the operational flow proceeds directly from step 701 of FIG. 4 to step 731 of FIG. 6. In step 731 it is judged whether the transmission flag corresponding to the ambulance switch 101 has been turned on. When the transmission flag has not been turned on, the operational flow directly proceeds to step 741. On the contrary, when the transmission flag has been turned on, step 732 is executed to change the LED 106 from a flash-on-and-off state to a leave-on state. Here, since the LED 106 is flashed on and off during the timer's counting and is left on after the counting, the user can visually recognize the period during which the user can cancel an incorrect operation, that is the above-mentioned predetermined time period (10 S), by looking at the LED's state.

After the execution of step 732, step 733 is executed to display a message, for example, "AMBULANCE" on the LCD 109. Step 734 is then executed to radio the emergency signal for requesting the ambulance and the ID code of the radio communication unit 200 to the control center 400 through the unit 200. The buzzer 111 chirps twice in step 735. It is noted that the user can make sure by steps 732 and 733 that the emergency signal will be radioed and by step 735 that the signal has been radioed.

After the execution of step 735, the operational flow proceeds step 741. Steps 741–745 and following steps 751–755 are executed for the police switch 102 and the road service switch 103, respectively, in the same way as the above-mentioned steps 731–735.

After receiving the emergency signal, the control center 400 transmits the emergency-signal received signal (the acknowledgment signal) to the unit 200. In step 759 it is judged whether the unit 200 has received the emergency-signal received signal. Until the determination in step 759 results in YES, step 759 is repeatedly executed. When the unit 200 has received the signal, the operational flow proceeds to step 760 to memorize the signal in a buffer of the microcomputer 104.

On the basis of the signal memorized in the buffer, it is then judged in step 761 whether the emergency signal which was received by the control center 400 is for requesting an ambulance. on the basis of the signal memorized in the buffer. When the signal is for requesting an ambulance, the buzzer 111 chirps once due to step 762, and due to step 763 the LCD 109 displays a message, for example, "AMBULANCE SIGNAL RECEIVED" for a predetermined period (3–4 seconds in this embodiment). When the signal in step 761 is not for requesting an ambulance, the operational flow directly proceeds to step 771.

Steps 771–773 and steps 781–783 are executed for the police and the road service, respectively, in the same way as steps 761–763. After the execution of step 783, the operational flow proceeds to step 790 in FIG. 7.

The control center 400 then confirms the estimated rescue arrival time and transmits the estimated rescue arrival time signal to unit 200. It is judged in step 790 whether the unit 200 has received the estimated rescue arrival time signal. in a step 790. Until the determination of step 790 results in YES, step 790 is repeatedly executed. When unit 200 has received the signal, the operational flow proceeds to step 791.

It is judged in step 791 whether the unit 200 has received the estimated rescue arrival time signal for the ambulance. If so, due to step 792 the LCD 109 displays a message for a while, for example, "AMBULANCE ETA 10 MIN.", and due to step 793 the buzzer 111 chirps. Otherwise, the operational flow directly proceeds to step 801.

Steps 801–803 and steps 811–813 are executed for the police and the road service, respectively, in the same way as the above-mentioned steps 791–793.

When the determination of step 811 results in NO or after the execution of step 813, the operational flow returns to step 790 to wait for the next estimated rescue arrival time signal.

According to steps 759–813, since the LCD 109 displays the messages for each emergency item, the user can be further relieved.

Figures 8A, 8B:
FIGS. 8A and 8B show examples of a display.

The present invention has been described with reference to the above-mentioned embodiments, but the present invention is not limited to these embodiments and can be modified without departing from the spirit or concept of the present invention, including those enumerated below:

(1) In the above-mentioned embodiment, each message is displayed on LCD 109 one after another. However, as shown in FIG. 8A, plural messages may be displayed simultaneously, or the messages may be flashed back and forth as shown in FIG. 8B.

(2) When the user requests plural emergency items in the above-mentioned embodiment, the communication device radios each emergency signal independently to the control center 400.

However, an special emergency signal for a combination (ambulance+police, police+road service, ambulance+police+road service, etc.) of the plural emergency services may be also provided in advance, and the microcomputer 104 may transmit such an exclusive emergency item instead of each emergency signal.

Figure 9:
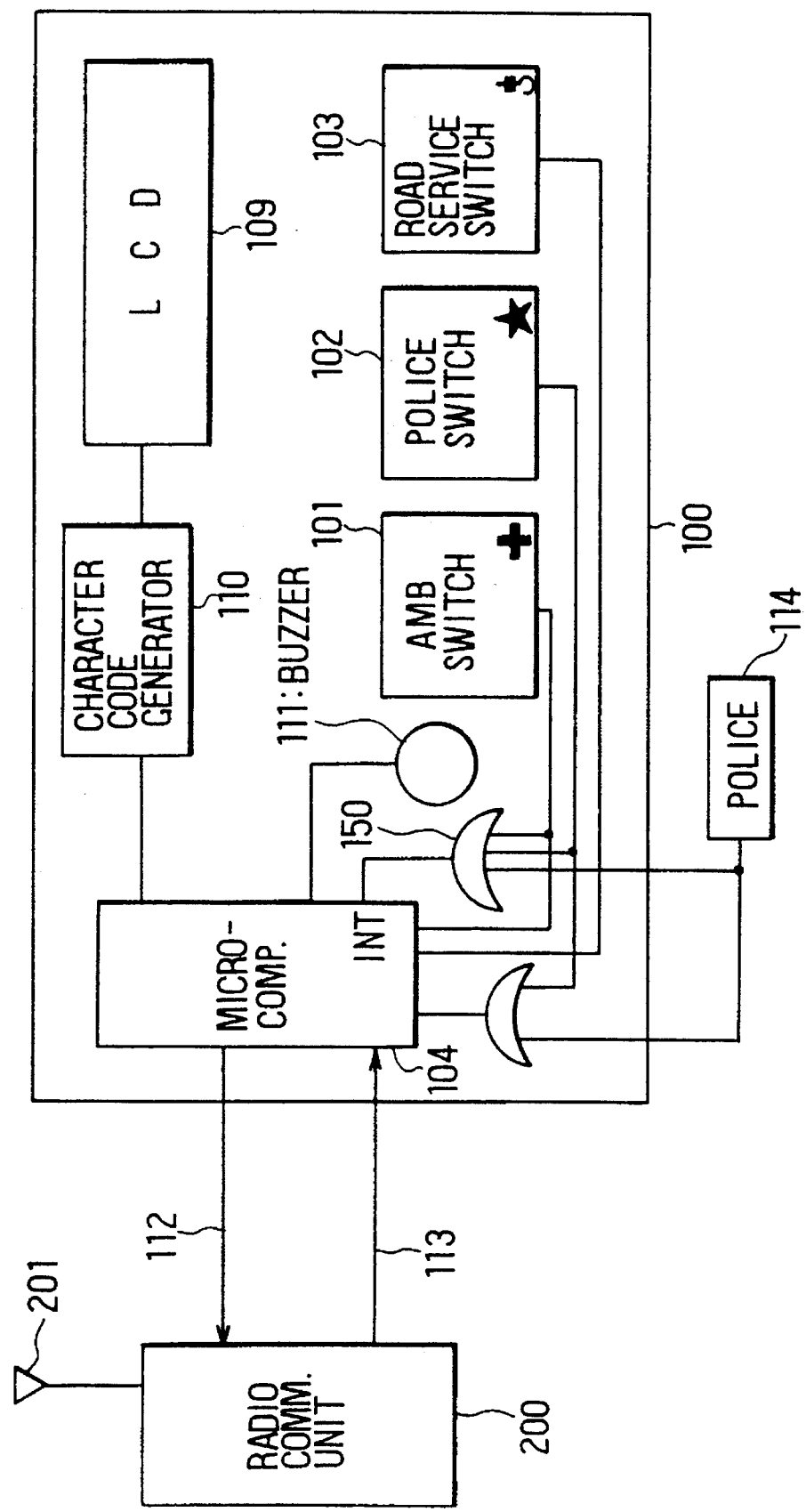
FIG. 9 is a block diagram of a communication device according to another embodiment of the present invention.

(3) FIG. 9 shows a vehicular communication device of another embodiment. The vehicular communication device is basically the same as the communication device shown in FIG. 1. However, it primarily differs therefrom in that, besides there being no LEDs 106–108, another police switch 114 is provided outside the call unit 100. (Like numerals in the corresponding figures indicate similar elements.) In the FIG. 1, the LEDs 106–108 are flashed on and off to inform the user of the period during which the user can cancel an incorrect operation. However, in FIG. 9, to advise the user of that period LCD 109 flashes on and off the message for the emergency item.

The additional police switch 114 is installed close to the driver's hand, for example, at the backside of a steering wheel or in an unnoticeable position such as to the side of or under a driver's seat. When the driver is attacked by a ruffian, the driver can report to the emergency by using the police switch 114 without notice by the ruffian.

(4) The microcomputer 104 may be connected with an ECU (Electronic Control Unit) for an air-bag system. In this case, when the air-bag system operates, the microcomputer 104 automatically transmits the emergency signal in response to an operational signal transmitted from the air-bag system to the microcomputer 104.

Figure 10:
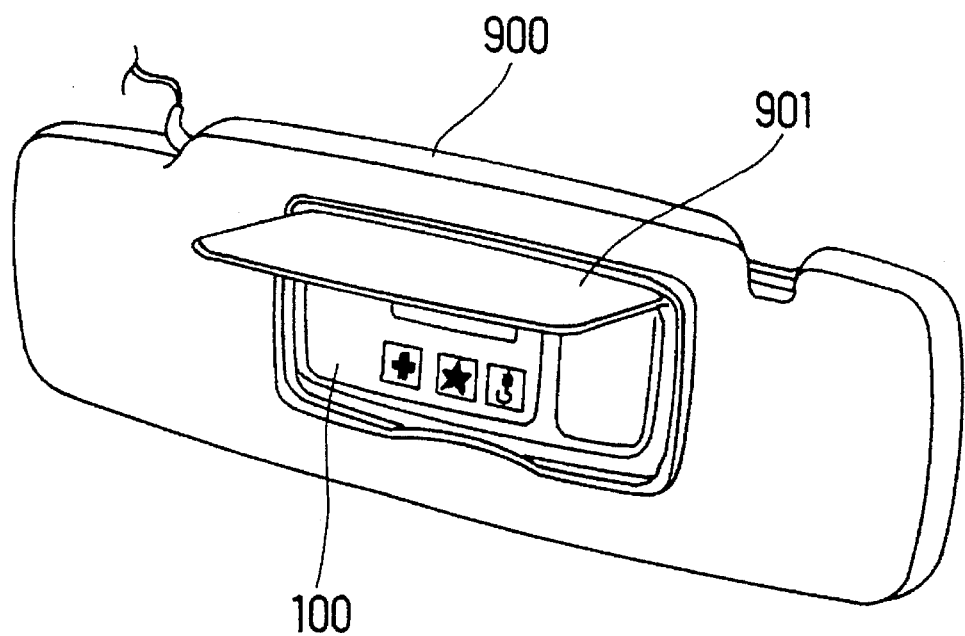
FIGS. 10 and 11 are perspective views of sunvisors which install a call unit.
Figure 11:
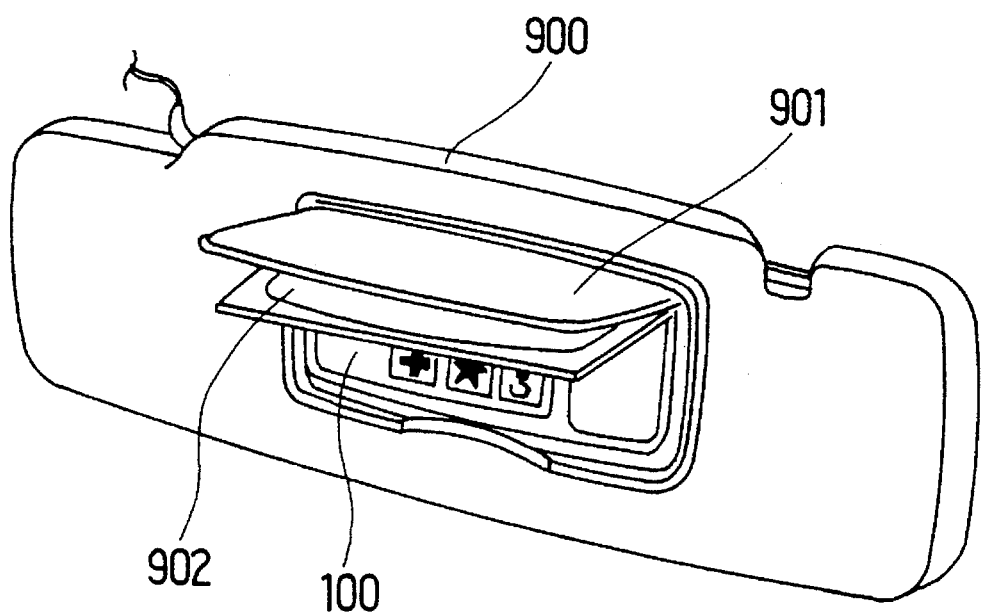

(5) As shown in FIG. 10, it is desirable to install the call unit 100 in the backside of a sunvisor 900 because that place is not usually conspicuous and the driver can easily reach it in the case of emergency. A cover 901 covering the call unit 100 may be provided. In this case, the call unit 100 may be turned on by the opening of cover 901. Moreover, as shown in FIG. 11, a vanity mirror 902 may be installed between the cover 901 and the call unit 100. In this case, the call unit 100 may be turned on by raising the vanity mirror 902.

(6) In steps 601, 603 and 605 shown in FIG. 3, only when the switch has been pushed for more than a predetermined period (for example, 1 second), it may be judged that the determination results in YES. Such a technique is effective against incorrect operation.

(7) The user may be allowed to control the power supply switch of the call unit 100 while the control center 400 controls power supply status modes (wake-up mode and sleeping mode) of the unit 200 which is always supplied with power. In that case, after the call unit 100 transmits an emergency signal to unit 200, unit 200 keeps in communication with the control center 400 even if the user turns off the call unit 100. The unit 200 then finishes the communication after the unit 200 receives the estimated rescue arrival time signal.

(8) The call unit 100 may have one or more other switches, for example, a switch for requesting a route guidance service. When the user wants to reach a place where the user does not remember the route, the switch enables the user to speak to a staff at the control center 400 through a car-telephone in order to guide the user to the place. In this case, the above-mentioned steps 790–813 concerning with the estimated rescue arrival time are omitted, i.e., not used.

What is claimed is:

1. An emergency vehicular communication device adapted to be installed in a vehicle, said device comprising:

a plurality of request switches respectively designating a plurality of services which a user may request, at least two of said switches being manually operable either sequentially or simultaneously at the option of said user;

request signal generating means for checking and storing operational conditions of all of said request switches even when operated simultaneously, and for generating at least one request signal, said at least one request signal being indicative of a plurality of requested services, based on said operational conditions of switches which have been operated within a predetermined actuation time period of one another, a plurality of different types of request signals being generable based on types of services needed by said user as reflected by operation of said request switches, said operational conditions of said request switches being provided to said request signal generating means simultaneously when said request switches are operated simultaneously;

transmitting means for transmitting said at least one request signal to a remote facility to alert each requested service in said plurality of services;

receiving means for receiving from said facility an acknowledgement signal acknowledging receipt of said at least one request signal;

an indicating device constructed and disposed to inform said user that said at least one request signal has been received by said facility.

2. A vehicular communication device according to claim 1, wherein said request signal generating means includes means for repeatedly checking said operational conditions for a predetermined period.

3. A vehicular communication device according to claim 2, wherein said predetermined period is a period during which said user operates any one of said request switches.

4. A vehicular communication device according to claim 1, wherein said acknowledgment signal includes information indicating which of said services has been requested, and wherein said indicating device comprises display means for displaying a message to confirm to said user that the facility received the request.

5. A vehicular communication device according to claim 1, wherein said request signal generating means checks said operational conditions in accordance with a predetermined order of priority.

6. A vehicular communication device according to claim 1, further comprising a timer for determining a predetermined period of time after one of said request switches is operated, wherein said at least one request signal generating means generates said request signal only after said user has not cancelled an inadvertent operation of said request switches within said predetermined period.

7. A vehicular communication device according to claim 6, further comprising cancel means for cancelling inadvertent operation of said request switches when one of said request switches is re-operated.

8. A vehicular communication device according to claim 6, wherein said request signal generating means includes a first memory means for memorizing information corresponding to an operated request switch and a second memory means for memorizing other information showing that said at least one request signal is ready to be transmitted, wherein said request signal generating means generates said at least one request signal only when said information memorized in said second memory means has not been corrected within said predetermined period.

9. A vehicular communication device according to claim 8, wherein said indicating device comprises display means and informing means for informing said user that said request switch has been operated.

10. A vehicular communication device according to claim 9, wherein said informing means causes different information to be displayed during said predetermined period than after said predetermined period so that said user can visually recognize when said predetermined period has expired.

11. A vehicular communication device according to claim 8, wherein said first memory means memorizes said information only when said request switch has been operating for a period of time longer than said predetermined period.

12. A vehicular communication device according to claim 1, further including a vehicle sunvisor containing at least said request switches and said indicating device.

13. A vehicular communication device according to claim 12, wherein said sunvisor has a cover for covering said request switches and said indicating device; and at least said request switches, said request signal generating means and said indicating device being turned on upon opening of said cover.

14. A vehicular communication device according to claim 6, wherein said predetermined period of time is a period of time during which a user may correct an incorrect request switch operation.

15. A vehicular communication device according to claim 1, wherein said at least one request signal is received by at least three different relay antennas in communication with said facility.

16. A vehicular communication device according to claim 15, wherein said remote facility includes position determining means for determining a position of said vehicle based on reception times of said different relay antennas.

17. An emergency vehicular communication device adapted to be installed in a vehicle, said device comprising:

a plurality of manually operable request switches for inputting a request for at least one emergency service which a user needs, said plurality of request switches being adapted to operate simultaneously;

means for determining when said request switches have been operated for a predetermined period of time;

item request signal generating means for checking an operational condition of each of said request switches when operated within a predetermined actuation time period of one another, and for generating at least one request signal when said request switches have been operated if said user has not cancelled an inadvertent operation of said request switches within said predetermined period of time, said at least one request signal alerting said at least one emergency service corresponding to said operated request switches; and transmitting means for transmitting said at least one request signal to a remote facility.

18. A vehicular communication device according to claim 17, further comprising cancel means for cancelling said inadvertent operation of said request switch when said request switch is re-operated.

19. A vehicular communication device according to claim 17, wherein said request signal generating means includes a first memory means for memorizing information corresponding to said request switch having been operated and a second memory means for memorizing other information showing that said at least one request signal is ready to be transmitted, wherein said request signal generating means generates said at least one request signal only when said information memorized in said second memory means has not been corrected within said predetermined period.

20. A vehicular communication device according to claim 19, including informing means for informing said user that said request switch has been operated.

21. A vehicular communication device according to claim 20, wherein said informing means advises said user that said predetermined period has expired.

22. A vehicular communication device according to claim 19, wherein said first memory means memorizes said information only when said request switch has been operating for a period of time longer than a predetermined period.

23. A method of communicating a plurality of service requests from a vehicle to a remote facility, said method comprising the steps of:

(a) manually operating one or more request switches installed in said vehicle sequentially or simultaneously at an option of a user, said request switches respectively designating a plurality of services that can be requested by a user;

(b) checking operational conditions of all of said request switches;

(c) generating at least one request signal, indicative of a plurality of requested services, as a function of the operating condition of said switches which have been operated within a predetermined actuation time period of one another, a plurality of different types of request signals being generable based on types of services needed by said user as reflected by operation of said request switches, said operational conditions of said request switches being used in said generating step simultaneously when said request switches are operated simultaneously;

(d) transmitting said at least one request signal to said remote facility and thereby alerting at least one emergency service corresponding to said operated request switches;

(e) receiving from said facility an acknowledgement signal acknowledging the facility's receipt of said at least one request signal; and (f) providing an indication responsive to said acknowledgement signal for assuring the user that said at least one request signal has been received by said facility.

24. A method of communicating a plurality of service requests according to claim 23, wherein said step (b) comprises the step of repeatedly checking said operational conditions of said switches for a predetermined period.

25. A method of communicating a plurality of service requests according to claim 23, wherein said step (b) comprises the step of repeatedly checking said operational conditions for a predetermined actuation period during which said user operates any one of said request switches.

26. A method of communicating a plurality of service requests according to claim 23, wherein said step (e) comprises the step of receiving information indicating which of said services has been requested, and said step (f) comprises the step of displaying a message to confirm to said user that the service facility received the request.

27. A method of communicating a plurality of service requests according to claim 23, wherein said step (b) comprises the step of checking said operational conditions in accordance with a predetermined order of priority.

28. A method of communicating a service request from a vehicle to a remote facility, said method comprising the steps of:

manually operating at least one of a plurality of request switches installed in a vehicle to input said service request;

checking an operational characteristic of each of said request switches sequentially and storing data indicative of operated switches;

generating at least one request signal in response to said stored data during a predetermined actuation time period if said user has not cancelled an inadvertent operation of said request switches within a predetermined period after said request switches have been operated; and transmitting said at least one request signal to said remote facility and thereby alerting at least one emergency service corresponding to said stored data indicative of operated switches.

29. A method of communicating a service request according to claim 28, further comprising a step of cancelling said inadvertent operation by re-operating said request switches.

30. A method of communicating a service request according to claim 28, further comprising a step of informing said user that said request switches have been operated.

31. A method of communicating a service request according to claim 30, wherein said informing step includes the step of advising said user that said predetermined period has expired.

32. The method of claim 31, wherein said transmitting step includes the step of transmitting service requests in said request signal in a predetermined order of priority of services corresponding to said operated switches.

33. The method of claim 31, further comprising the step of informing a user when at least one of said request switches is operated.

34. The method of claim 33, wherein said informing step includes the steps of:

providing, during said predetermined time period, a first indication that a request may be cancelled, and providing, after said predetermined time period, a second indication that a request may not be cancelled.

35. The method of claim 31, further comprising the steps of:

receiving an acknowledgement signal indicating the services that have been requested; and indicating to a user that said acknowledgement signal has been received.

36. A method of communicating a service request to a remote service facility from a vehicle having a plurality of manually-operated request switches, said method comprising the steps of:

checking operation states of all of said request switches sequentially;

storing in a memory indicia indicative of each of those of said request switches which are operated during said checking step;

generating a request signal corresponding to said indicia; and transmitting said request signal to said remote service facility so that all services corresponding to said switches operated during said checking step may be requested substantially simultaneously irrespective of sequential or simultaneous operation of said request switches during said checking step.

37. The method of claim 36, wherein said storing step comprises a step of deleting an indicia when a switch corresponding to said indicia is again operated for cancellation of a prior operation of said corresponding switch during a predetermined period of time.

* * * * *